United States Patent [19]

Göhler et al.

[11] Patent Number: 4,710,202
[45] Date of Patent: Dec. 1, 1987

[54] APPARATUS FOR GASIFYING PULVERIZED COAL

[75] Inventors: Peter Göhler; Rolf Mangler; Manfred Schingnitz, all of Freiberg; Wolfgang Seidel, Oberbobritzsch; Friedrich Berger, Brand-Erbisdorf, all of German Democratic Rep.; Ernest Gudymov, Moscow, U.S.S.R.; Vladimir Semenov, Moscow, U.S.S.R.; Vasilij Fedotov, Moscow, U.S.S.R.; David Gamburg, Moscow, U.S.S.R.

[73] Assignee: Brennstoffinstitut Freiberg, Freiberg, German Democratic Rep.

[21] Appl. No.: 928,750

[22] Filed: Nov. 7, 1986

[30] Foreign Application Priority Data

Nov. 12, 1985 [DD] German Democratic Rep. .................................... 2827492

[51] Int. Cl.⁴ ............................................. C10J 3/48
[52] U.S. Cl. .......................................... 48/73; 48/69; 48/76
[58] Field of Search ................... 48/76, 77, 63, 67, 69, 48/73, DIG. 1, 203, DIG. 4

[56] References Cited

U.S. PATENT DOCUMENTS

| | | | |
|---|---|---|---|
| 1,116,216 | 11/1914 | Berry | 48/DIG. 1 |
| 4,272,255 | 6/1981 | Contes | 48/67 |
| 4,305,732 | 12/1981 | Koenig et al. | 48/67 |
| 4,334,892 | 6/1982 | Livermore | 48/67 |
| 4,377,132 | 3/1983 | Koog et al. | 48/67 |

*Primary Examiner*—Peter Kratz
*Attorney, Agent, or Firm*—Michael J. Striker

[57] ABSTRACT

An apparatus for gasifying pulverized coal, the apparatus comprising a housing with a granulated slag discharge opening in a bottom of the housing, and a producer gas outlet opening in a lower part of the housing; a layer of thermal insulation lining the housing; a pulverized coal burner having a discharge area in the top of the housing; a layer of heat-resistant lining located above the producer gas outlet opening; a steam injection inlet; and a plurality of ducts arranged between the heat-resistant lining and the thermal insulation and extending between the steam injection inlet to the discharge area, each of the ducts having an outlet opening arranged at a level of the discharge area and an inlet opening arranged above the steam injection means. Steam is injected into the housing and the producer gas is cooled with a plurality of cooling medium supply nozzles arranged in the housing.

13 Claims, 2 Drawing Figures

F I G. 2
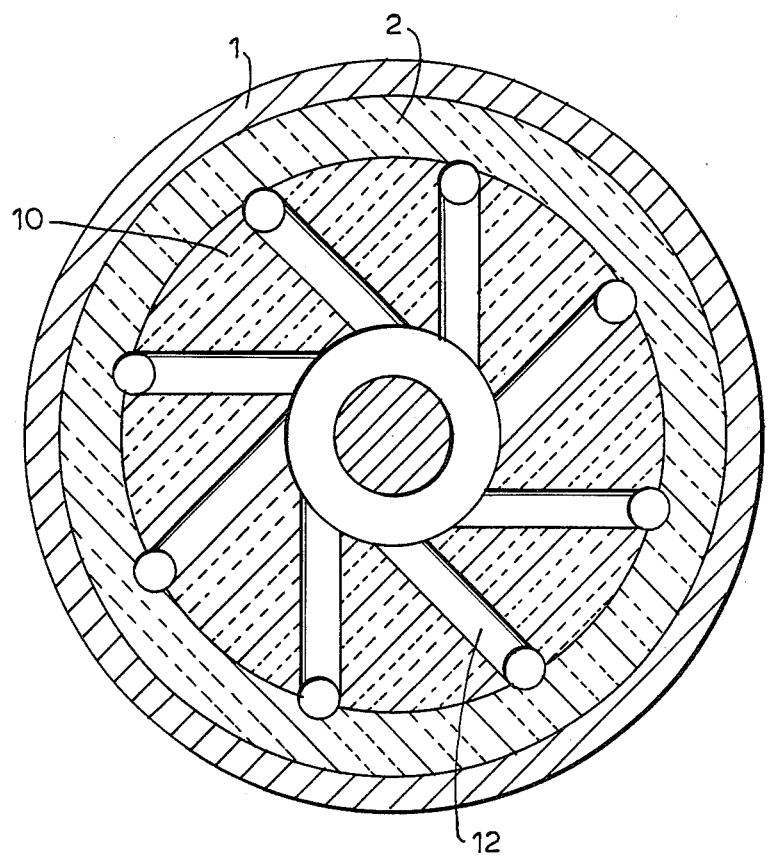

APPARATUS FOR GASIFYING PULVERIZED COAL

FIELD OF THE INVENTION

The proposed invention relates to apparatuses for gasifying pulverized coal with steam and an oxygen-containing gas, and it can be employed in the chemical industry to manufacture a producer gas from solid fuels.

BACKGROUND OF THE INVENTION

A conventional apparatus for gasifying pulverized coal comprises a housing provided with a thermal insulation and with an outlet pipe connection for passing off the producer gas and an outlet connection for the discharge of granulated slag. There is a pulverized-coal burner arranged in the upper part of the housing and an overflow pipe for maintaning a water level in the lower part of the housing and a gas-tight tube screen is constricted centrally to divide the interior space of the apparatus into a reaction zone and a radiation zone, and which forms an opening for passing the producer gas and the liquid slag from the reaction zone into the radiation zone. In the reaction zone, this tube screen is fitted with studs carrying a layer of refractory ramming material (USSR patent document No. 1136475, cl. C 10 J 3/08, 1981).

This apparatus has substantial disadvantages:

1. A poor quality of the producer gas is obtained with a high expenditure of energy because the tube screen is constricted centrally, fitted with studs (in the reaction zone) and provided with a layer of refractory ramming material on the studs and also because the apparatus is operated with liquid slag discharge. This means that the producer gas temperature upstream of the central constriction must be higher by 200° to 400° C. than the temperature required for gasification. It is necessary to burn part of the $H_2$ and CO produced to maintain such a temperature level which, in turn, reduces the quality of the producer gas and increases the oxygen consumption.

2. The apparatus cannot be operated on coals which produce a slag containing constituents having low fusion points, and consequently high vapor pressures, since the radiation zone is provided with a tube screen on which such constituents would deposit and which would be clinkered up gradually as would be the ducts for gas passage; ultimately, this would lead to a failure of the apparatus.

An apparatus for gasifying pulverized coal which is almost similar to the proposed invention with regard to engineering aspect and effects to be achieved comprises a housing with a cover provided with a thermal insulation; an outlet pipe connection for passing off the producer gas, this connection being provided in the side wall of the lower part of the housing; an outlet connection for the discharge of granulated slag being provided axially in the bottom of the housing; a pulverized-coal burner provided axially in the cover of the housing; an overflow pipe for maintaining a water level in the lower part of the housing; a gas-tight tube screen with openings in the top and bottom parts which form tube grids; and inlet pipes for steam injection which are connected to a manifold. This apparatus can be operated in such a way that the gasification process takes place at temperatures ranging above the fusion temperature of the slag. Due to special design features, however, clinkering-up of the tube screen and other surfaces within the apparatus is prevented. These design features contribute to the formation of an areal flow of circulating gas parallel to the tube screen which acts as a protective layer having a temperature below the ash softening point.

This apparatus has substantial disadvantages:

1. A poor quality of the producer gas is obtained with a high expenditure of energy for gas production because the tube screen removes a substantial amount of heat from the producer gas. This removal has to be compensated for by burning part of the product obtained ($CO + H_2$) to maintain the temperature required for gasification. In this process, the content of CO and $H_2$ in the producer gas decreases and the oxygen consumption becomes too high.

2. The apparatus cannot be operated on coals which produce an ash containing constituents having low fusion points because such constituents would evaporate and deposit on the tube screen, gradually clinkering it up as well as the ducts between the thermal insulation and the tube screen. This would finally result in in a failure of the apparatus.

OBJECTS OF THE INVENTION

It is the object of the present invention to improve the quality of the producer gas, to reduce the expenditure of energy and to make feasible the use of coals which yield an ash containing constituents having low fusion points.

SUMMARY OF THE INVENTION

It is the aim of the invention to design the apparatus for gasifying pulverized coal according to the principle of a partial oxidation of fuels under pressure in such a way that coals yielding an ash with a low fusion point can be utilized and that the gas output is improved.

The present invention apparatus for gasifying pulverized coal with steam and an oxygen-containing gas can be employed in the chemical and gas industries, respectively. It is an object of the invention to improve the quality of the producer gas.

In particular, the invention relates to the design of the reactor lining, to the engineering solution of a circulation of cooled gas to form an areal gas flow parallel to the lining, and to the arrangement of inlets for steam injection and water supply.

The apparatus for gasifying pulverized coal according to the invention comprises a housing provided with a cover and a thermal insulation; an outlet pipe connection for passing off the producer gas, in the side wall of the lower part of the housing for passing off the producer gas; an outlet connection arranged axially in the bottom of the housing for the discharge of granulated slag; a pulverized-coal burner provided axially in the cover of the housing; an overflow pipe for maintaining the water level in the lower part of the housing; and inlet pipes for steam injection which are connected to a manifold. The apparatus is provided with a heat-resistant lining above the outlet pipe connection for passing off the producer gas. It is also provided with ducts between the heat-resistant lining and the thermal insulation which are bent at a right angle and whose lower ends are arranged vertically and parallel to the walls of the housing. The upper ends are arranged tangentially, in relation to the axis of the housing, along the internal surface of the cover of the housing. The outlet openings of these ducts are arranged on the cover of the housing at the level of the port area of the pulverized-coal burner. The inlet openings of these ducts are arranged coaxially above the inlet pipes for steam injection. The walls of the housing are provided with nozzles for the supply of water or of a steam/water mixture, these nozzles being arranged in several rows distributed over the height of the housing.

The ducts may be openings between the heat-resistant lining and the thermal insulation, or tubes made of heat-resistant steel. In practice, the installation of heat-resistant lining instead of a tube screen in the interior of the apparatus makes it possible to prevent any dissipation of heat from the flame during gasification. This results in a reduction of oxygen consumption and an increase of the contents of CO and $H_2$ of the producer gas.

Moreover, the risk of a condensation of ash constituents having low fusion points (and a high vapor pressure) on the heat-resistant lining is eliminated since the temperature of these constituents would attain a comparatively high level (800°-1,000° C.). Thus, it is possible to use coal types which yield an ash containing constituents having low fusion points, such as salt coals.

The arrangement of the vertical ducts bent at a right angle between the heat-resistant lining and the thermal insulation, which are in the form of openings or of tubes made of heat-resistant steel, also makes it possible to prevent any condensation of ash constituents having low fusion points.

The horizontal sections of the through ducts which are arranged tangentially to the axis of the housing contribute to a stabilization, due to the effects of centrifugal forces, of the protective areal flow of cooled recycled producer gas containing ash in a solid state, and thus to a reduction in the amount of steam which is injected through the inlet pipes for producer gas circulation; this, in turn, leads to a reduction of the expenditure of energy required for gasifier operation.

The provision of several rows of nozzles in the housing designed for the supply of water or of a steam/water mixture contributes to a further stabilization of the protective areal flow of gas and to a lowering of the temperature of the recycled producer gas below the ash softening temperature; thus, clinkering-up of the outlet connection and of the ducts is prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The apparatus for gasifying pulverized coal is shown in FIGS. 1 and 2.

FIG. 2 is a cross section of the apparatus take across section lines A—A of FIG. 1.

DETAILED DESCRIPTION OF THE PREFERRED EMBODIMENTS

Figure 1:
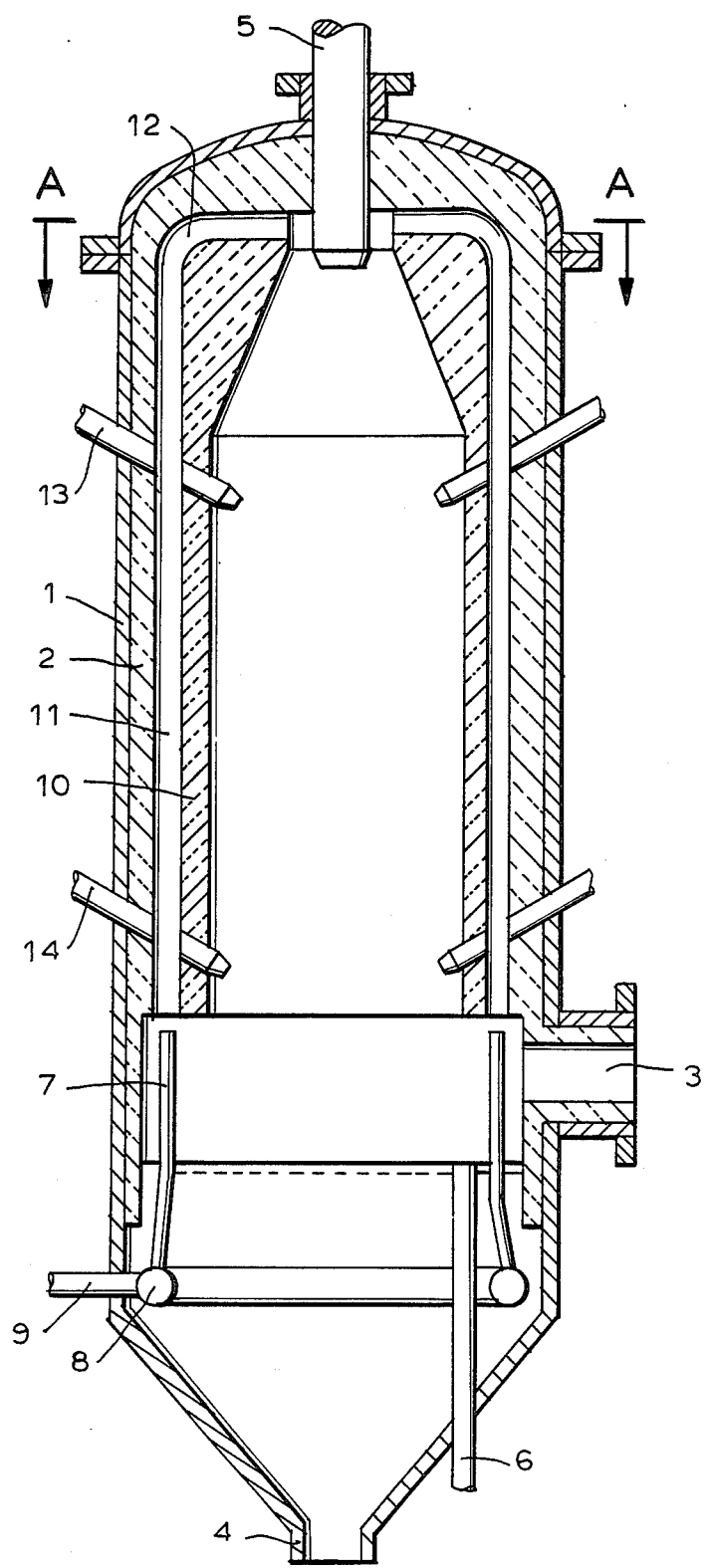
FIG. 1 is a vertical elevation sectional view.

The apparatus for gasifying pulverized coal according to FIGS. 1 and 2 comprises a housing 1 provided with a thermal insulation 2, an outlet pipe connection 3 for passing off the producer gas, and an outlet connection 4 for the discharge of granulated slag; a pulverized-coal burner 5; an overflow pipe 6; inlet pipes 7 for steam injection connected to an inlet pipe connection 9 via a manifold 8; a heat-resistant refractory lining 10; through ducts between the heat-resistant lining and the thermal insulation which are bent to form right angles and which comprise vertical sections 11 and horizontal sections 12 arranged tangentially to the axis of the housing; and an upper row of nozzles 13 and a lower row of nozzles 14 for the supply of water or of a steam/water mixture.

The apparatus is operated as follows: Prior to start-up the apparatus is filled with an inert gas and the internal pressure is increased to operating pressure level. Through the inlet pipe connection 9 steam is supplied to the manifold 8 and is introduced through the inlet pipe 7. This steam sucks the inert gas into the vertical duct sections 11 thereby considerably increasing its velocity. At the outlets of the horizontal duct sections 12 the mixture of steam and inert gas forms an areal flow parallel to the heat-resistant lining 10, which acts as a protective layer. The stability of this protective layer is ensured by the effect of centrifugal forces. The surplus mixture is passed off through the outlet pipe connection 3.

Water is supplied through the lower row of nozzles 14 and forms a body of liquid in the lower part of the housing 1 which is kept at a constant level by means of the overflow pipe 6.

Pulverized coal, a gas containing oxygen, and steam are supplied through the pulverized-coal burner 5. A flame is formed which extends along the axis of the apparatus and in which the gasification of the pulverized coal takes place. Water, or a steam/water mixture, is fed through the upper row of nozzles 13 to stabilize the protective layer. Gradually, the inert gas is replaced by producer gas and the protective layer finally consists of a mixture of producer gas and steam. The slag separating from the producer gas granulates in the body of water in the lower part of the housing 1 and is discharged through the outlet connection 4. The producer gas is passed off via the outlet pipe connection 3.

Upstream of the outlet pipe connection 3 and, thus, the duct sections 11 as well, the temperature of the producer gas is maintained constant at 700° to 800° C. by operating the row of nozzles 13 and essentially the row of nozzles 14, whereas the temperature of the heat-resistant lining ranges between 800° and 1,000° C.; this eliminates the risk of a condensation of evaporated ash constituents having low fusion points. The temperature of the recycle gases remains below the softening point of the ash, and thus liquid or pasty slag particles solidify in the protective layer.

Tables 1 and 2 below list comparable operational characteristics of apparatuses manufactured according to the prototype and according to the proposed invention, and designed for a throughput of 50 t/h of pulverized brown coal and a process of gasification with oxygen at a pressure of 30 atm (Table 1), and for a throughput of 25 t/h of pulverized coal and a process of gasification with air (Table 2).

TABLE 1

| Characteristics | Apparatus acc. to prototype | Apparatus acc. to invention |
|---|---|---|
| Average temperature in reaction zone - °C. | 1,450 | 1,450 |
| Oxygen consumption - $m^3(n)/h$ | 26,700 | 24,875 |
| Raw gas composition - vol. % | | |
| $H_2O$ | 11.14 | 9.05 |

TABLE 1-continued

| Characteristics | Apparatus acc. to prototype | Apparatus acc. to invention |
|---|---|---|
| $N_2$ | 5.29 | 5.17 |
| $H_2$ | 21.05 | 23.19 |
| CO | 54.12 | 56.06 |
| $CO_2$ | 7.89 | 6.03 |
| $H_2S$ | 0.40 | 0.40 |
| Output (CO + $H_2$) - $m^3(n)/h$ | 64,873 | 68,307 |
| Heat loss in reaction zone - kcal/h | 9,008,000 | — |
| Oxygen consumption per 1,000 $m^3(n)$ of hydrogen + carbon monoxide produced - $m^3(n)/h$ | 412 | 364 |

Table 1 shows that the apparatus according to the proposed invention enables the output of $CO/H_2$ mixture to be increased by 5.3% and the specific oxygen consumption per 1,000 $m^3(n)$ of mixture to be reduced by 13%, i.e. that it enables the oxygen consumption to be reduced by 7%.

TABLE 2

| Characteristics | Apparatus acc. to prototype | Apparatus acc. to invention |
|---|---|---|
| Average temperature in reaction zone - °C. | 1,450 | 1,450 |
| Average consumption - $m^3(n)/h$ | 85,355 | 74,713 |
| Raw gas composition - vol. % | | |
| $H_2O$ | 8.42 | 7.58 |
| $N_2$ | 63.08 | 59.96 |
| $H_2$ | 3.81 | 5.73 |
| CO | 15.07 | 19.27 |
| $CO_2$ | 9.18 | 7.01 |
| $H_2S$ | 0.40 | 0.40 |
| Output (CO + $H_2$) - $m^3(n)/h$ | 20,626 | 25,227 |
| Heat loss in reaction zone - kcal/h | 8,954,000 | — |
| Air consumption per 1,000 $m^3(n)$ of hydrogen + carbon monoxide produced - $m^3(n)/h$ | 4,140 | 2,960 |

Table 2 shows that the air consumption in the apparatus according to the proposed invention is lower by 14% in the process of gasification with air, and that the output of $CO/H_2$ mixture is higher by 22% and the specific air consumption per 1,000 $m^3(n)$ is lower by 40%.

REFERENCE NUMERALS USED

1 Housing
2 Thermal insulation
3 Outlet pipe connection for passing off producer gas
4 Outlet connection for discharge of granulated slag
5 Pulverized-coal burner
6 Overflow pipe
7 Inlet pipes for steam injection
8 Manifold
9 Inlet pipe connection
10 Heat-resistant lining
11 Vertical section of the duct bent at a right angle
12 Herizontal section of the duct bent at a right angle
13 Upper row of nozzles
14 Lower row of nozzles It will be understood that each of the elements described above, or two or more together, may also find a useful application in other types of apparatus for gasifying coal differing from the types described above.

While the invention has been illustrated and described as embodied in an apparatus for gasifying coal, it is not intended to be limited to the details shown, since various modifications and structural changes may be made without departing in any way from the spirit of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspect of this invention.

What is claimed as new and desired to be protected by Letters Patent is set forth in the appended claims:

1. An apparatus for gasifying pulverized coal, the apparatus comprising:
   a housing having a top, a lower part with a bottom, a granulated slag discharge opening in said bottom, and a producer gas outlet opening in said lower part;
   a layer of thermal insulation lining said housing;
   a pulverized coal burner extending axially through said top and being formed to produce a flame for gasifying coal to provide a producer gas;
   a layer of heat-resistant lining located above said producer gas outlet opening and defining a discharge area, said pulverized coal burner having an extended portion extending axially into said discharge area so as to direct said flame axially downward further into said discharge area, said discharge area having an upper space radially surrounding said extended portion of said pulverized coal burner;
   a plurality of ducts arranged between said heat-resistant lining and said thermal insulation and each having an outlet opening communicating with said upper space of said discharge area and having an inlet opening, each of said ducts extending horizontally from said outlet opening and then bending vertically downward to terminate at said inlet opening;
   means for injecting steam into said inlet opening of each of said ducts; and
   means for cooling the producer gas and including a plurality of cooling medium supply nozzles arranged in said housing and extending into said discharge area.

2. The apparatus as defined in claim 1, wherein said housing has a side wall, each of said ducts having lower and upper portions, said lower portion being arranged vertically and parallel to said side wall, said upper portion being arranged substantially at a right-angle to said lower portion and extending to said dicharge area along said top of said housing.

3. The apparatus as defined in claim 2, wherein said housing has an axis, said upper portion of each of said ducts being arranged tangentially relative to said housing axis, said lower portion being arranged parallel to said housing axis.

4. The apparatus as defined in claim 1, wherein each of said ducts is composed of heat-resistant material.

5. The apparatus as defined in claim 1, wherein each of said ducts is formed as an opening between said thermal insulation and said heat-resistant lining.

6. The apparatus as defined in claim 1, wherein said steam injecting means includes a plurality of inlet pipes, each of said inlet openings of said ducts being arranged coaxial with a respective one of said inlet pipes.

7. The apparatus as defined in claim 1, wherein said housing has a height and a side wall, said plurality of cooling medium supply nozzles being arranged in a plurality of rows distributed over said height through said side wall.

8. The apparatus as defined in claim 1, wherein said cooling means includes means for supplying water and further comprising means for maintaining a water level in said lower part of said housing and including an overflow pipe.

9. The apparatus as defined in claim 1, wherein said cooling means includes means for supplying a water/steam mixture and further comprising means for maintaining a water level in said lower part of said housing and including an overflow pipe.

10. The apparatus as defined in claim 1, wherein said housing has an upper opening, said top being a removable cover closing said upper opening.

11. An apparatus for gasifying pulverized coal, the apparatus comprising:

a housing having an axis, a height, a side wall, a lower part with a bottom, a cover opposite said bottom, a granulated slag discharge opening in said bottom, and a producer gas outlet opening in said lower part;

a layer of thermal insulation lining said housing;

a pulverized coal burner extending through said cover and being formed to produce a flame for gasifying pulverized coal;

means for maintaining a water level in said lower part of said housing;

means for injecting steam including a plurality of inlet pipes and a steam manifold communicating with and connecting said inlet pipes, said inlet pipes being arranged in said lower part of said housing;

a layer of heat-resistant lining above said producer gas outlet opening and defining a discharge area, said pulverized coal burner extending into said discharge area so as to direct said flame axially downward further into said discharge area;

a plurality of ducts arranged between said heat-resistant lining and said thermal insulation, each of said ducts having an outlet opening communicating with said discharge area and having an inlet opening arranged coaxially in communication with a respective one of said inlet pipes of said injecting means and having lower and upper portions, said lower portion vertically extending from said inlet opening parallel to said side wall of said housing and bending at a right-angle into said upper portion, said upper portion then extending tangentially relative to said housing axis to said outlet opening, said inlet pipes being arranged so that steam is injectable into said inlet opening of each of said ducts from said steam manifold via said inlet pipes; and means for supplying one of water and a water/steam mixture into said discharge area and including a plurality of nozzles arranged in a plurality of rows distributed over said height of said housing and through said side wall and each of said nozzles extending into said discharge area.

12. The apparatus as defined in claim 11, wherein said ducts are formed as openings between said heat-resistant layer and said thermal insulation.

13. The apparatus as defined in claim 11, wherein said ducts are formed as pipes made of heat-resistant steel.

* * * * *